April 30, 1935.  F. X. MUDD  1,999,526
POULTRY CAR
Filed Nov. 21, 1932
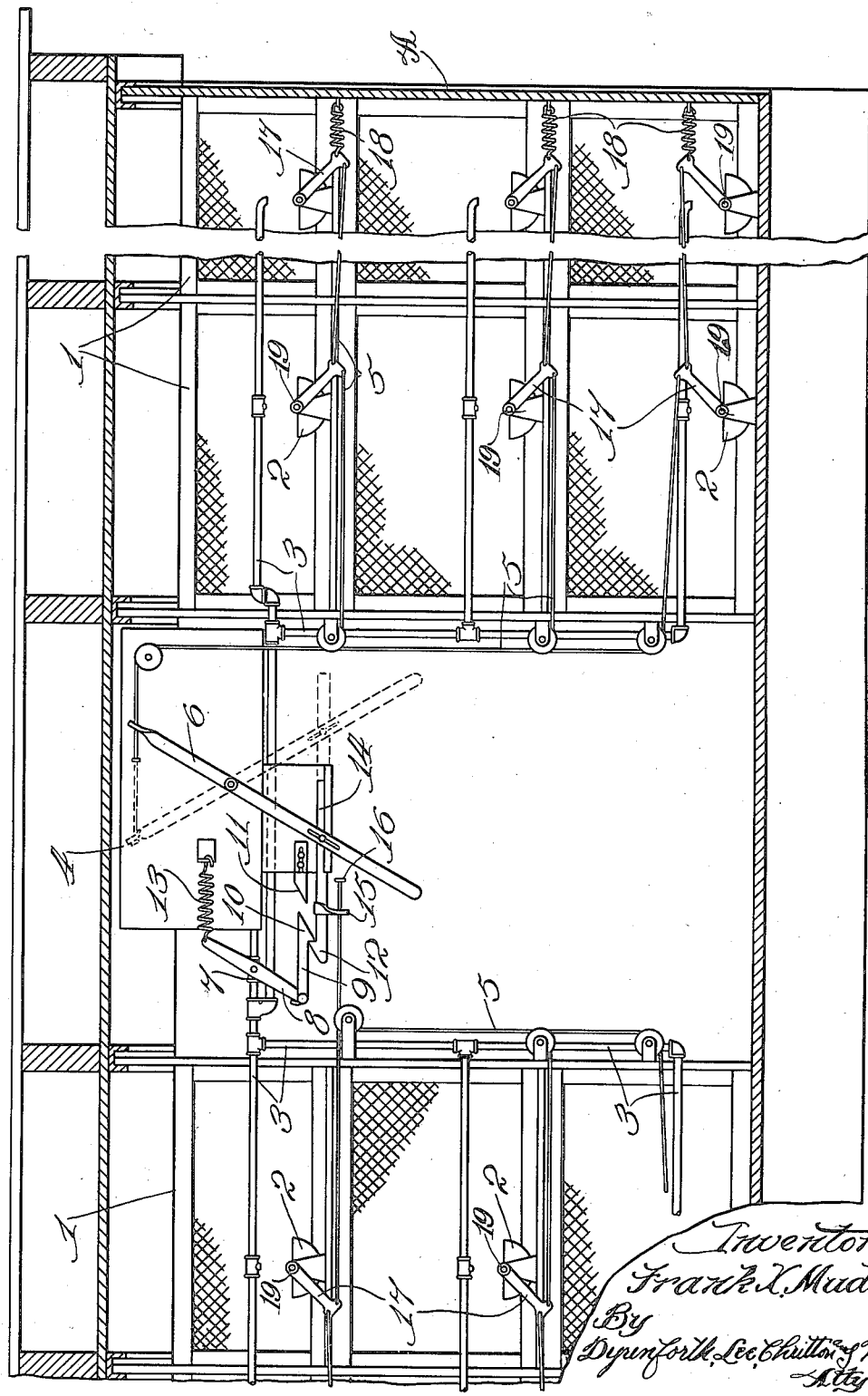

Patented Apr. 30, 1935

1,999,526

UNITED STATES PATENT OFFICE 1,999,526

POULTRY CAR

Frank X. Mudd, Chicago, Ill.

Application November 21, 1932, Serial No. 643,726

5 Claims. (Cl. 119—12)

This invention relates to improvements in poultry cars and particularly to an apparatus for cleansing the feeding troughs.

Poultry cars are customarily provided with a plurality of vertically arranged tiers of coops arranged about a central aisle. The coops are provided with feeding troughs which must be cleaned after each feeding in order to prevent disease and keep the poultry clean and healthy. The cleaning of these individual troughs requires a great deal of time and trouble. In accordance with the present invention a central means is provided for automatically cleaning all of the troughs at one time.

The invention is illustrated in the drawing wherein the figure shows a vertical section of a typical poultry car A.

The coops 1 are provided with feed troughs 2 supplied with water through the pipe lines 3 from the central water tank 4. The feed troughs are mounted on trunnions 19, and are connected at the ends of the dumper arms 17 by the dumping cables 5 to the lever 6, which is so mounted as to control both sides of the car.

The water running to the feed pipes 3 is controlled by the valve 7. On pulling of the lever 6 the valve arm 8 pivotally attached to the valve 7 is drawn to the right until the nose 10 of the bar 9 impinges upon the stop 11. During this period, the valve 7 is open and water flows to the troughs 2. When the nose 10 strikes the stop 11, however, the bar 9 is lifted free from the hook 12 and the valve 7 is then closed by the spring 13 attached to the upper end of the arm 8. After the water has been shut off, the shoulder 15 on the arm 14 engages the shoulder 16 on the dumping control and further movement of the lever overturns each of the troughs 2. On returning the lever to its original position the dumping cable 5 attached to the troughs is pulled backwardly by the springs 18 and restores the troughs to their original position.

By means of the present invention, the single lever may be drawn over sufficiently to open the valve and admit the desired amount of water to the troughs; the lever may then be advanced further to take up the lost motion in connection with the actuating lever; and the troughs rocked back and forth sufficiently to loosen up the material therein before the troughs are dumped by completion of the forward stroke of the lever. Thus, it will be understood that no water is wasted and the valve is turned off during the return movement of the lever and when the valves are in normal position. If desired, the troughs may be used as watering troughs and they may be filled from the tank by merely moving the lever forward a short distance and then allowing it to return without dumping the troughs.

The lever, of course, may control only the troughs on one side of the car, and separate means may be provided for the controlling of water and the dumping.

The foregoing detailed description has been given for clearness of understanding only, and no unnecessary limitations should be understood therefrom, but the appended claims should be construed as broadly as permissible, in view of the prior art.

I claim:

1. In a poultry car, filling and dumping mechanism for a plurality of tiltably mounted troughs comprising: a pipe for conducting water to said troughs; a valve for controlling the flow of water through said pipe; and a manually operable unitary lever having means for successively opening and closing said valve and tilting said troughs to empty the same.

2. Mechanism as specified in claim 1, in which the means comprises a spring and trigger mechanism for automatically closing said valve when the lever is moved to trough-tilting position.

3. In a poultry car, filling and dumping mechanism for a plurality of tiltably mounted troughs equipped with actuating arms, comprising: a water tank equipped with a pipe for conducting water to said troughs; a valve in said pipe; spring means for closing said valve; a unitary operating lever; and means connecting said lever with said actuating arms and valve whereby the valve is opened and closed and the troughs dumped successively during a single forward stroke of said lever.

4. Mechanism as specified in claim 3, in which the connecting means comprises a trigger connection between the lever and valve whereby said valve remains closed during the return stroke of the lever.

5. Mechanism as specified in claim 3, in which the connecting means comprises a lost-motion connection between the actuating arms and lever.

FRANK X. MUDD.